Nov. 16, 1965 P. V. BLANKENSHIP 3,218,313

METHOD AND APPARATUS FOR THERMALLY DEHYDRATING NITROCELLULOSE

Filed Dec. 21, 1961

INVENTOR.
P. V. Blankenship

BY

S. J. Rotondi, A. J. Dupont
& A. D. Akers

United States Patent Office 3,218,313
Patented Nov. 16, 1965

3,218,313
METHOD AND APPARATUS FOR THERMALLY DEHYDRATING NITROCELLULOSE
Paul V. Blankenship, Radford, Va., assignor, by mesne assignments, to the United States of America as represented by the Secretary of the Army
Filed Dec. 21, 1961, Ser. No. 161,319
3 Claims. (Cl. 260—223)

This invention relates to the apparatus and process for thermally drying violently decomposable or explosive materials and particularly for the thermal drying of nitrocellulose.

The method of dehydrating nitrocellulose presently in use requires a four step process involving centrifugation, alcohol pressure dehydration, alcohol recovery, and block-breaking operations. This method produces a nitrocellulose product which is lumpy and difficult to process.

An object of the present invention is to produce a single continuous process for dehydration of low compaction nitrocellulose, using automatically controlled loading and unloading techniques, while complying with acceptable safety practices, which would result in appreciable savings.

Another object of this invention is to produce a nitrocellulose product which is uniform in moisture and solvent content and is free of lumps whereby subsequent solvation may be more readily achieved.

A further object of the present invention is to construct an apparatus which will allow a considerably smaller quantity of the hazardous material to be in the dehydrating process at any given time and which will enhance safety by reducing personnel exposure.

Still another object of the present invention is to reduce the cost of dehydrating nitrocellulose to one-third or one-fourth the cost of the method presently employed.

Other and further objects and advantages of the present invention will become apparent from the following specification taken in connection with the accompanying drawing.

In the drawing, there are illustrated two aspects of this invention, wherein.

Figure 1:
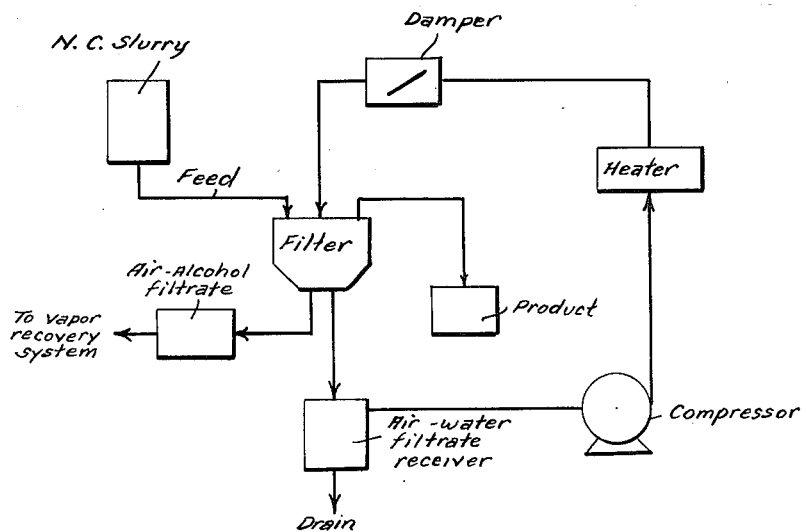
FIGURE 1 is a schematic layout of the flow process.

Referring now to FIGURE 1, the basic process comprises feeding the nitrocellulose-water slurry onto the filter bed where the water is removed. Circulating hot air, recycled from the air-water filtrate receiver, is supplied to the filter through the heater by a rotary blower. The inlet temperature is automatically regulated by a thermally controlled damper located in the hot air duct between the filter hood and the air heater. Air flow to the unit will be automatically stopped in case of the development of excessive temperatures under the hood. The air-filtrate passing off is divided into two systems, namely, an alcohol-air system and a water-air system. Each system is drawn into separate receivers where the air is separated from the filtrates. The liquids are drained from their respective receivers and the alcohol is processed for reuse while the water is sent to settling pits. After a predetermined time on the filter bed, the product is removed and sent to storage.

To carry out my process, the construction of a new and novel filter was required. Two basic types of filters were investigated, namely, the horizontal vacuum filter and the drum vacuum filter. Both pieces of equipment utilize the same principle of drying although the mechanical arrangements are different. The two types of equipment are comparable in initial cost and efficiency, however, the mechanical arrangement and design of the rotary drum filter does not lend itself as favorably from materials handling, equipment arrangement, and safety standpoints as does the horizontal filter.

Figure 2:
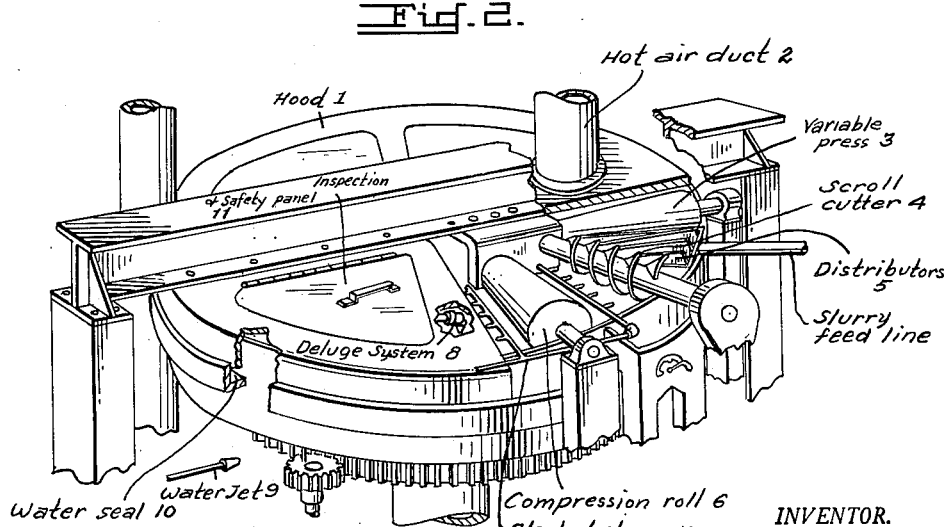
FIGURE 2 is a perspective view of the vacuum filter construction according to this invention.

The equipment which has been found to provide the most suitable thermal drying is the horizontal, rotary vacuum filter illustrated in FIGURE 2. It is equipped with a warm air hood 1 covering the filter area and sealed to the side of the filter frame by a water seal 10 which will also serve as a gas escape vent in case of fire. The major area of the hood is fabricated from sheet metal and has small panels 11 hinged on one side which will swing upward, serving as gas escape vents in case of excessive internal pressure resulting from explosions. A variable pressure compression roll 3 is located immediately following the feed distributor arrangement 5 and another variable pressure compression roller 6 is located on the exit side of the hood. An alcohol spray header 7 is located immediately before and after this latter compression roller 6.

A water deluge system 8 is installed under the warm air hood 1 for quick, automatic activation in case of fire. The entire system may be optionally equipped with a general shower arrangement for periodic washing; however, it is important to continuously spray a small stream of water 9 on the drive gear ring located well under the filter pan, to prevent the accumulation of nitrocellulose fines. The preferred air temperature level for the present method of thermal drying is 150° F. This temperature level is considered relatively safe in respect to the auto-ignition temperature of nitrocellulose which has been determined to be above 300° F. While an air temperature of 150° F. is preferred from an economic standpoint, it is not to be construed that it is the only temperature at which the process will operate. Any air temperature would be satisfactory which is below the auto-ignition temperature of the product and above the dew point of the air source. Varying air temperatures may be compensated by varying the rotation speed of the filter bed in direct proportion to the air temperature, i.e., the higher the air temperature, the greater the rotation speed of the filter bed. Therefore, at the preferred air temperature of 150° F., it has been found that 89,600 cubic feet per minute of air are necessary to produce 280 pounds of nitrocellulose per minute. This rate of production would require approximately 350 square feet of filter area.

The product removal is best accomplished by a modified scroll type cutter 4. The scroll cutter should be of a rigid non-ferrous material or a suitable material edged with "Teflon."

Essentially the method comprises loading the nitrocellulose slurry onto the rotating filter bed by gravity or vacuum feed, and it is immediately passed under a compression roller which dewaters the nitrocellulose as much as possible. The cake then passes beneath the warm air hood at a rotation speed necessary to deliver the nitrocellulose at the desired moisture level. The final compaction and washing steps following the hot air drying are performed by a second compression roller and the alcohol spray header. The dried nitrocellulose may then be removed from the filter surface with a non-ferrous scroll cutter. The following examples are cited to further illustrate the invention and are not intended to limit it in any way.

*Example 1*

A laboratory leaf test was run using nitrocellulose. The optimum cake thickness of approximately 0.75 inch of nitrocellulose was found by measuring the pressure drop across the cake at various degrees of thickness at a constant air rate. Approximately 320 cubic feet of air at 150° F. were required to reduce the moisture content of a pound of nitrocellulose from a 70 percent water slurry state to about 3 percent. It was also determined that eight-tenths pound (dry weight) of nitrocellulose would cover approximately one square foot of filter area at a cake thickness of approximately three-quarters of an inch. Equipment calculations based on these data indicate that at peak nitrocellulose requirements of 12 million pounds per month would require approximately 350 square feet of filter or drier area. These calculations also indicate that an air supply of 89,600 c.f.m. (cubic feet per minute) would be required. The theoretical electrical power required to produce this volume of air amounted to 1303 kilowatts per hour and the steam required to raise the temperature of this volume of air from 70° F. to 150° F. amounted to 7,476,000 B.t.u.'s per hour. The total cost of the hot air delivered to the filter cake would amount to approximately one-tenth cent per pound.

*Example 2*

Next, a horizontal, rotary vacuum filter having a standard four foot diameter filter was constructed. The unit was equipped with a hood and compression rolls. Air at a temperature of 150° F. was introduced into the hood and passed through the filter cake at a rate of approximately 200 c.f.m. per square foot of filter cake. Optimum cake thickness after compression rolling appeared to be approximately one inch, weighing one pound per square foot. A drying cycle of four minutes was necessary to accomplish the drying of the product to a moisture level of approximately three percent. Thus, it would require about 800 cubic feet of air at a temperature of 150° F. per pound of dehydrated cellulose product. Based upon the values obtained from the operation of this unit and the laboratory leaf work, it would require 350 square feet of filter area and 89,600 c.f.m. of air at 150° F. to produce approximately 280 pounds of nitrocellulose per minute. The cost of the power and heat necessary to dehydrate one pound of nitrocellulose by this method amounts to approximately $0.001.

I claim:

1. A method for the thermal dehydration of explosive cellulose material utilizing a rotating filter bed having two sets of rollers therein comprising the following steps in sequence; feeding an explosive cellulose slurry onto the rotating filter bed, rotating the material to be treated on the moving filter bed, dewatering by squeezing with one of said sets of rolls said cellulose slurry, passing heated air at approximately 150° F. through the filter cake at a rate of approximately 320 cubic feet per minute per pound of filter cake to reduce the moisture content to approximately 3%, spraying said dewatered cake with alcohol, compressing the said dewatered cake with the other set of rolls, thereafter spraying again with alcohol and removing as a stable product the filter cake from the rotating filter bed.

2. Apparatus for the thermal dehydration of nitrocellulose comprising: a horizontal vacuum rotary filter having a filter bed continuously rotating, said filter bed having a hood covering the bed, the junction of the hood and the filter bed sealed with an air-tight water seal, hinged gas escape panels in said hood, means for continuously feeding through said hood the nitrocellulose slurry onto the filter bed, means for rotating the filter bed and the material thereon, a first set of rolls within the filter for squeezing the water from the nitrocellulose slurry, ducts in the hood for passing heated air of regulated temperature through the filter cake, headers for spraying the filter cake with alcohol, a second set of rolls downstream from said headers for squeezing the filter cake again, a water deluge system attached to the underside of the hood downstream and spaced from said ducts for periodic washing and for safety against explosions and cutters for continuously removing the dehydrated filter cake from the rotary filter.

3. A method for the thermal dehydration of explosive cellulose utilizing a rotating filter having rollers thereon, comprising the following steps in sequence; feeding an explosive cellulose slurry onto said rotating filter in small batches to reduce the hazard, rotating the filter with the contained slurry material, passing the slurry through one of the rollers within said filter to squeeze out the water, drying the filter cake with heated air at approximately 150° F. passing through said cake at a rate of approximately 320 cubic feet per minute per pound to reduce the moisture content to approximately 3%, spraying said dried cake with alcohol, compressing the filter cake by passage through another one of the rollers, again spraying said cake with alcohol for washing and continuously removing the filter cake from the filter to obtain a highly stable nitrocellulose product.

References Cited by the Examiner

UNITED STATES PATENTS

| | | | |
|---|---|---|---|
| 452,213 | 5/1891 | Castanos et al. | 100—210 X |
| 806,131 | 12/1905 | Gentieu et al. | 260—223 |
| 2,127,360 | 8/1938 | Helle et al. | 210—396 X |
| 2,256,017 | 9/1941 | Curran | 34—187 X |
| 2,366,880 | 1/1945 | Stern | 260—223 |
| 2,367,487 | 1/1945 | Desetti et al. | 34—9 X |
| 2,846,944 | 8/1958 | Willmes et al. | 100—153 |

REUBEN FRIEDMAN, *Primary Examiner.*

HERBERT L. MARTIN, *Examiner.*